Feb. 25, 1969    W. F. GLOVER    3,430,176
ELECTRICAL WINDINGS
Filed Dec. 20, 1966

United States Patent Office 3,430,176
Patented Feb. 25, 1969

3,430,176
ELECTRICAL WINDINGS
William Frank Glover, London, England, assignor to International Standard Electric Corporation, New York, N.Y., a corporation of Delaware
Filed Dec. 20, 1966, Ser. No. 603,237
Claims priority, application Great Britain, Dec. 23, 1965, 54,589/65
U.S. Cl. 336—172                                                5 Claims
Int. Cl. H01f *17/04, 27/28*

This invention relates to electrical windings and in particular to windings for transformers.

In electrical transformers the desired transformation ratio is obtained by giving each of its windings the appropriate number of turns. In the great majority of cases the ratio can be realized to the required degree of accuracy by giving each winding a whole number of turns.

Cases arise however, when the required number of turns of the winding is either determined by considerations other than the turns ratio or the number of turns of the windings is so small that in order to achieve the desired ratio, windings having fractional turns must be used. Such cases arise in particular in transformers for communication networks and circuits to be used at high frequencies.

A known method of realizing a fractional turn is to arrange for a conductor which is part of a winding to link with only a fraction of the total magnetic flux of the transformer. Thus if a conductor links with say one half of the total flux it is said to be a half turn, or more generally if it links with $1/n$ of the total flux it is said to be an $n$th turn.

This method has however the disadvantage of increasing the leakage inductance of the winding.

It is an object of this invention to realize windings having fractional turns without increasing the leakage inductance.

According to the invention there is provided an electrical winding linking substantially with the whole of a given magnetic flux distributed over a given area and having a number of turns $n$ equal to a fraction $M/N$ where M and N are integers and M is not an integral multiple of N comprising N sections connected in parallel with each other, each of said sections linking with a fraction $M/N$ of the total flux, each part of the periphery of the winding having M conductors, all conductors carrying flowing in the same direction.

The invention will now be described with reference to the accompanying drawings in which.

In order to bring out clearly the principle used to realize a fractional turn winding FIGS. 1 to 4 show in plan view only the outline of the conductors forming the winding. The magnetic core is omitted and it must be imagined that the magnetic flux is normal to the plane of the paper and is uniformly distributed over the circular area bounded by the conductors arranged along the periphery of the circle.

Figure 1:
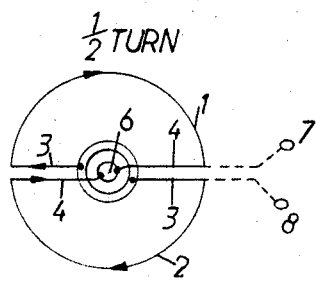
FIGS. 1 to 4 show in schematic form winding configurations.

The winding shown in FIG. 1 is realized by two sections 1 and 2 each having the shape of a semi-circle. The ends of the sections are cross-connected by conductors 3 and 4 which are also taken to terminals 5 and 6. It is apparent that the two sections of the winding are connected in parallel with each other and that each section links with one half of the total flux, so that the voltage induced in the winding is one half that which would be induced in a winding having one whole turn. The winding of FIG. 1 is thus a "half-turn" winding. It will also be observed that the current in the periphery of both sections of the winding flows in the same direction, but that the currents in the two cross-connecting conductors 3 and 4 flow in opposite directions. These radial conductors, therefore, do not increase the impedance of the winding.

Figure 2:
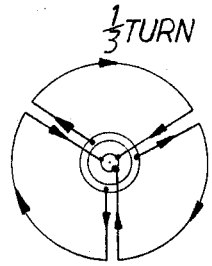

If a ⅓ turn winding is required it will have three sections connected in parallel, each section linking with ⅓ of the total magnetic flux. This case is shown in FIG. 2. Here again the currents in the peripheral conductors of the winding flow in the same direction but cancel in each of the radial sections.

Figure 3:
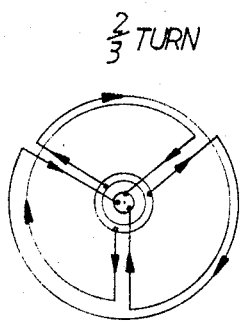
Figure 4:
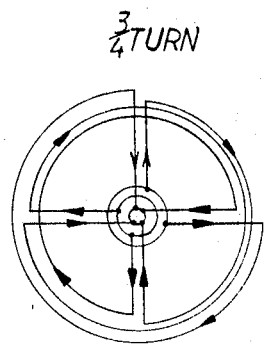

In the case of a two-third turn winding three sections are provided each embracing two thirds of the total flux. This is shown in FIG. 3 from which it is apparent that the periphery of the winding comprises two conductors. As a final example, FIG. 4 shows a winding equivalent to a ¾ turn.

From the above examples the general procedure to lay-out a required fractional turn winding became apparent.

The required turn is expressed as a fraction $M/N$. Then N gives the number of sections to be connected in parallel, $M/N$ gives the fraction of the whole flux linking with each section.

$$\frac{360. \ M}{N}$$

gives the segment angle subtended by each section and M gives the number of peripheral conductors of the winding.

In the cases so far considered the fractional turn winding always had less than one turn, but it will be readily seen that turns greater than 1 can be realized by the method described. Thus 1¼ turns=5/4 which means a winding having 4 sections, each section embracing $M/N$ the part of the total flux and having 5 peripheral conductors.

In some high frequency applications a transformer including a fractional turn winding can be realized without the use of a core of magnetic material by locating the fractional turn winding in proximity to the other windings to give the required coupling factor. In the majority of cases however the transformer will be provided with a core of magnetic material which may or may not include an air gap.

Figure 5:
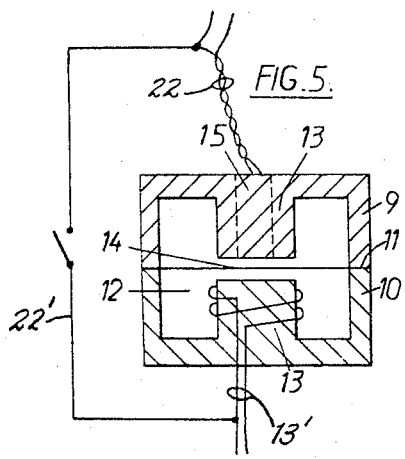
FIG. 5 shows a sectional view of a transformer using a pot core magnetic circuit.

A type of magnetic core frequently used in high frequency applications is known as a pot core and is shown in FIG. 5. It comprises two half cores 9 and 10 which abut along face 11. The windings of the transformer are placed in the cavity 12 around the central bosses 13 which are separated from each other by an air gap 14. This gap is usually provided in order to stabilise the performance of the core. One of the bosses 13 is provided with a central bore 15.

A convenient position for the location of the fractional turn winding is between the faces of the central bosses 13 mounted coaxially with the main winding, indicated at 13' which is placed within the cavity 12 of the core. The lead out wires of the fractional turn winding are taken out through the bore 15.

Figure 6:
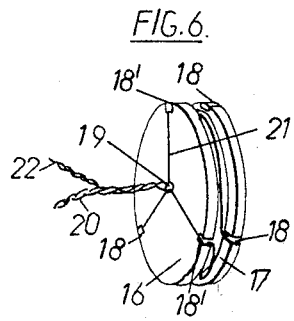
FIG. 6 shows a perspective drawing of a spool for a fractional turn winding.

A practical form of a fractional turn winding for use within an air gap of a pot core is shown in FIGURE 6. It is supported on a disc shaped spool 16 made of non-conducting material. The diameter and axial thickness of the spool are made substantially equal to the diameter and legnth of the air gap in the magnetic core. The body 16 of the spool is provided with a peripheral groove 17 for the conductors of the winding and each cheek has cut in it N radial slots 18 or 18' spaced apart $360/N$ degrees. The spool is provided with a central hole 19.

The winding is formed by taking a conductor 20 formed by twisting N strands of wire together through the central hole 19. The N strands are separated and fanned out radially across the outside of the right hand cheek of the spool, each strand being passed through one of the radial slots 18 into the peripheral groove for a circumferential distance of $M/N$ 360 degrees. The strands are then taken out of the groove via an appropriate slot 18' in the left hand cheek and are taken radially towards the centre of the spool as indicated by 21 in FIG. 6. The strands forming the return lead 22 are twisted, connected together and taken parallel to conductor 20.

The two lead out wires are then taken through the hole 15 in the central boss of the pot core shown in FIG. 5 and connected either to an external circuit or to one of the main windings 13' located in the cavity 12. This latter connection, of course, may be through a line 22' via either a switch or a permanently wired connection.

Although the description of realizing a fractional turn winding given above is particularly convenient and when used in pot cored transformers it is not limited to this type of transformer. The winding can be used in arrangements in which the lead out wires of the winding are taken not from the centre but from the periphery of the bobbin. It is also not necessary that the magnetic core of the transformer is provided with an air gap. The conductors forming the fractional turn winding can be taken through the body of the core for which purpose the latter must be provided with suitable apertures.

It is to be understood that the foregoing description of specific examples of this invention is made by way of example only and not to be considered as a limitation on its scope.

What I claim is:

1. Electrical windings comprising means for linking substantially the whole of a given magnetic flux distributed over a given area with a number of turns $n$ equal to a fraction $M/N$ where M and N are integers and M is not an integral multiple of N, said means including N winding sections connected in parallel with each other, each of said winding sections linking with a fraction $M/N$ of the total flux, each part of the periphery of the winding having M conductors, and all conductors carrying current flowing in the same direction.

2. Windings as claimed in claim 1 in which the N sections of the winding are supported on a circular spool having a diameter equal to that of said area, said spool having a peripheral groove into which the windings are inserted, said spool including cheeks which are provided with radial slots or holes spaced 360 N degrees apart, a conductor forming a section of the winding being taken through a slot in one of the cheeks into the peripheral groove for a circumferential distance $$\frac{M}{N} \times 360°$$

and then taken out of the groove through an appropriate one of the slots in the other cheek, the N conductors on each side of the spool being joined together.

3. Windings as claimed in claim 2 in which the spool is located in an air gap of a core of magnetic material.

4. Windings as claimed in claim 3 in which the core is provided with at least one additional winding linking with the whole magnetic flux and having an integral number of turns, said fractional turn winding sections and the additional winding constituting the two windings of a transformer.

5. Windings as claimed in claim 4 including means by which a winding having an integral number of turns and linking with the whole flux can be connected in series with the fractional turn winding.

References Cited

UNITED STATES PATENTS 2,283,711  5/1942  Welch _____ 336—172
3,098,990  7/1963  Farrand et al. _____ 336—172

LEWIS H. MYERS, *Primary Examiner.*

T. J. KOZMA, *Assistant Examiner.*

U.S. Cl. X.R.

336—180